United States Patent [19]

Kawarai et al.

[11] Patent Number: 5,035,947

[45] Date of Patent: Jul. 30, 1991

[54] MAGNETIC RECORDING MEDIUM INCLUDING MAGNETIC METALLIC POWDER

[75] Inventors: Seigi Kawarai, Hyogo; Sadamu Kuse, Osaka; Yasushi Orita, Kyoto, all of Japan

[73] Assignee: Hitachi Maxell, Ltd., Osaka, Japan

[21] Appl. No.: 299,020

[22] Filed: Jan. 19, 1989

[30] Foreign Application Priority Data

Jan. 22, 1988 [JP] Japan .................................. 63-12850

[51] Int. Cl.$^5$ ............................................. G11B 23/00
[52] U.S. Cl. ..................................... 428/329; 428/402; 428/694; 428/900
[58] Field of Search ............... 428/323, 329, 402, 694, 428/900; 252/62.54, 62.62, 62.63, 62.64

[56] References Cited

U.S. PATENT DOCUMENTS

| | | | |
|---|---|---|---|
| 4,652,500 | 3/1987 | Ejiri et al. | 428/694 |
| 4,696,859 | 9/1987 | Miyoshi et al. | 428/694 |
| 4,701,364 | 10/1987 | Miyoshi et al. | 428/694 |
| 4,701,372 | 10/1987 | Akiyama et al. | 428/694 |
| 4,702,959 | 10/1987 | Shimozawa et al. | 428/694 |

*Primary Examiner*—Paul J. Thibodeau
*Attorney, Agent, or Firm*—Birch, Stewart, Kolasch & Birch

[57]. ABSTRACT

A magnetic metallic powder comprising metal iron, at least 0.1% by weight of manganese based on the weight of metal iron and at least one alkaline earth metal in an amount 1 to 50 times the weight of manganese and a magnetic recording medium having a magnetic layer comprising the magnetic metallic powder, which magnetic layer has improved durability as well as improved magnetic characteristics and electromagnetic conversion characteristics.

10 Claims, No Drawings

MAGNETIC RECORDING MEDIUM INCLUDING MAGNETIC METALLIC POWDER

BACKGROUND OF THE INVENTION

1. Field of the Invention

The present invention relates to a magnetic metallic powder and a magnetic recording medium comprising the magnetic metallic powder as a magnetic recording element. More particularly, the present invention relates to comprising a magnetic metallic powder a magnetic recording medium having improved durability as well as magnetic recording characteristics and electromagnetic conversion characteristics.

2. Description of the Related Art

A magnetic recording medium is generally produced by coating a magnetic paint comprising a magnetic powder, a binder, an organic solvent and other necessary component(s) on a substrate, such as a polyester film, and drying the paint. When the magnetic recording medium is required to have high performances, a magnetic metallic powder, such as metal iron powder, is used as the magnetic recording element.

However, the magnetic metallic powder, such as the metal iron powder, has a larger magnetic moment and a less smooth surface and in turn a larger specific surface area measured by the BET method than a magnetic metal oxide powder. In addition the former is chemically more active than the latter. Finally, the magnetic metallic powder is insufficiently dispersed in a binder resin, so that the magnetic recording medium comprising the magnetic metallic powder as the magnetic recording element has unsatisfactory magnetic characteristics or electromagnetic conversion characteristics.

SUMMARY OF THE INVENTION

One object of the present invention is to provide a magnetic metallic powder having good hardness and improved magnetic characteristics and electromagnetic conversion characteristics.

Another object of the present invention is to provide a magnetic recording medium having better durability and highly improved magnetic characteristics and electromagnetic conversion characteristics.

According to the first aspect of the present invention, there is provided a magnetic metallic powder comprising metal iron, at least 0.1% by weight of manganese based on the weight of metal iron and at least one alkaline earth metal in an amount 1 to 50 times the weight of manganese.

According to the second aspect of the present invention, there is provided a magnetic recording medium comprising a substrate and a magnetic layer formed thereon which comprises the magnetic metallic powder of the present invention as the magnetic recording element.

DETAILED DESCRIPTION OF THE INVENTION

Since the magnetic metallic powder of the present invention comprises metal iron, manganese and the alkaline earth metal, the hardness of the powder particles is substantially increased so that the particles themselves act as abrasive particles and, in turn, the mechanical strength of a magnetic layer including the magnetic metallic powder is sufficiently improved. In addition, since a thin layer containing manganese and the alkaline earth metal is formed on the surfaces of the metal iron particles, the metal iron can be reduced at a comparatively high temperature, and voids from which oxygen has been liberated and the unevenness on the surface can be filled or smoothened. Therefore, the dispersibility of the metallic powder in the binder resin of the magnetic layer is sufficiently improved.

The magnetic metallic powder of the present invention can be produced by various methods. For example, iron ions and manganese ions are co-precipitated during the formation of goethite which is a raw material of the magnetic metallic powder to form goethite which contains managanese in a solid solution form and then an alkaline earth metal compound is coated on the solid state form goethite, or a manganese compound and the alkaline earth metal compound are coated on the goethite particles. Then, the goethite particles and $\alpha$-$Fe_2O_3$ which has been formed by the reduction of the goethite are reduced in a stream of steam. Alternatively, the goethite containing only manganese or the goethite having only the coated manganese compound and $\alpha$-$Fe_2O_3$ which has been formed by the reduction of such goethites are reduced in the stream of steam and then the alkaline earth metal compound is coated on the reduced particles. Preferably, manganese is present on the goethite particles in the form of an oxide or a hydroxide, since a homogeneous dense coating layer can be formed from manganese oxide or hydroxide.

When the amount of manganese is less than 0.1% by weight based on the weight of the metal iron, the durability of the magnetic layer cannot be desirably increased. Preferably, the amount of manganese is from 0.1 to 1% by weight, more preferably from 0.1 to 0.3% by weight based on the weight of the metal iron.

When the content of the alkaline earth metal is less than one time the weight of manganese, the intended effects are not achieved. When the content of the alkaline earth metal is larger than 50 times the weight of manganese, saturation magnetization and dispersibility in the binder of the magnetic metallic powder are decreased. Preferably, the content of the alkaline earth metal is from 1 to 30 times the weight of manganese.

The alkaline earth metal includes calcium, magnesium, beryllium, strontium and barium. Among them, calcium and magnesium are preferred.

The magnetic recording medium having the magnetic layer comprising, as the magnetic recording element, the magnetic metallic powder of the present invention, may be produced by a per se conventional method. For example, the magnetic metallic powder of the present invention is dispersed in and mixed with the binder resin, an organic solvent and other necessary components to prepare the magnetic paint, and applied on a non-magnetic substrate, such as a polyester film, by a suitable method, such as spraying or roll coating, and drying the coated magnetic paint.

As the binder resin, any of conventional one may be used. Examples of the bider resin are polyvinyl chloride resins, vinly chloride-vinyl acetate copolymers, cellulose resins, butyral resins, polyurethane resins, polyester resins, epoxy resins, polyether resins, isocyanate compounds and the like. Among them, the resins having an average molecular weight of not more than 30,000 are preferably used since the magnetic metallic powder is well dispersed in the resin.

As the organic solvents, those in which the binder resin is well dissolved are used. Examples of such solvents are ketones (e.g. cyclohexanone, methyl ethyl ketone, methyl isobutyl ketone, etc.), esters (e.g. ethyl acetate, butyl acetate, etc.), aromatic hydrocarbons (e.g. benzene, toluene, xylene, etc.), sulfoxides (e.g. dimethyl sulfoxide, etc.), ethers (e.g. tetrahydrofuran, dioxane, etc.) and mixtures thereof.

The magnetic paint may contain any of the conventionally used additives such as lubricants, abrasives and antistatic agents.

PREFERRED EMBODIMENTS OF THE INVENTION

The present invention will be illustrated by the following Examples, in which "parts" are by weight.

EXAMPLES 1-6

A magnetic metallic iron powder containing manganese in an amount specified in Table 1 based on the weight of metal iron and calcium or magnesium in an amount specified in Table 1 based on the weight of manganese was mixed with the following components in the following amounts in a ball mill for 72 hours to prepare a magnetic paint premix (A):

| Component of the premix (A) | Parts |
| --- | --- |
| Magnetic metallic iron powder | 100 |
| Vinyl chloride/vinyl acetate/vinylalcohol copolymer (VAGH manufactured by U.C.C., U.S.A.) | 12 |
| Polyurethane resin (Nipporan N 3113 manufactured by Nippon Polyurethane Industries, Japan) | 8 |
| α-Fe$_2$O$_3$ powder | 4 |
| α-Al$_2$O$_3$ powder | 4 |
| Carbon black (HS-500 manufactured by Asahi Carbon, Japan) | 1 |
| Lauric acid | 5 |
| n-Butyl stearate | 1 |
| Cyclohexanone | 67 |
| Methyl isobutyl ketone | 67 |
| Toluene | 67 |

Then, to the premix (A), a trifunctional low molecular weight isocyanate compound (Colonate L manufactured by Nippon Polyurethane Industries, Japan) (5 parts) was added and the mixture was well mixed by a ball mill for one hour to obtain the magnetic paint (B).

The prepared magnetic paint (B) was coated on a polyester film having a thickness of 14 μm and dried to form a magnetic layer having a dry thickness of 4 μm. After surface treatment, the film having the magnetic layer was cut to a predetermined width to obtain a magnetic tape.

Comparative Examples 1 and 2

In the same manner as in Examples 1-6 but using the magnetic metallic iron powder having the composition shown in Table 1, the magnetic tape was produced.

TABLE 1

| Example No. | Composition of magnetic powder | | |
| --- | --- | --- | --- |
| | Mn/Fe (wt %) | Ca/Mn (times) | Mg/Mn (times) |
| 1 | 0.14 | 10 | — |
| 2 | 0.12 | 1 | — |
| 3 | 0.12 | 10 | — |
| 4 | 0.12 | 30 | — |
| 5 | 0.12 | — | 10 |
| 6 | 0.25 | 10 | — |
| Comp. 1 | 0.0015 | 0.5 | — |
| Comp. 2 | 0.0015 | — | — |

Output and magnetic characteristics of each of the magnetic tapes produced in Examples and Comparative Examples were measured as follows:

Output

After recording signals of 5 MHz at a constant level, output during reproducing is measured and expressed as a relative value to the output of the magnetic tape of Comparative Example 1 (0 dB).

Magnetic Characteristics

A predetermined number of the magnetic tapes are piled. Then, a hysteresis curve is recorded by means of a sample vibration type magnetic strength meter (VSM) at a magnetic field strength of 10 kOe and then converted with the thickness of the magnetic tape to obtain a residual magnetic flux density and a squareness ratio.

The results are summarized in Table 2.

TABLE 2

| Example No. | Output (dB) | Residual magnetic flux density (G) | Squareness ratio |
| --- | --- | --- | --- |
| 1 | +0.7 | 2,730 | 0.81 |
| 2 | +0.8 | 2,690 | 0.80 |
| 3 | +0.3 | 2,630 | 0.81 |
| 4 | +0.4 | 2,603 | 0.80 |
| 5 | +0.5 | 2,640 | 0.81 |
| 6 | +0.4 | 2,630 | 0.80 |
| Comp. 1 | 0 | 2,320 | 0.77 |
| Comp. 2 | −0.5 | 2,200 | 0.76 |

As understood from the results of Table 2, the magnetic tapes of the present invention (Examples 1-6) have larger output, residual magnetic flux density and squareness ratio than the conventional magnetic tapes (Comparative Examples 1 and 2). This means that the magnetic metallic powder of the present invention has better magnetic characteristics and electromagnetic conversion characteristics, so that the magnetic recording medium of the present invention has greatly improved magnetic characteristics and electromagnetic conversion characteristics. The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magnetic metallic powder consisting essentially of metal iron, at least 0.1% by weight of manganese based on the weight of said metal iron and at least one alkaline earth metal in an amount of from 1 to 50 times the weight of said manganese.

2. The magnetic metallic powder according to claim 1, wherein the amount of manganese is from 0.1 to 1% by weight based on the weight of said metal iron.

3. The magnetic metallic powder according to claim 2, wherein the amount of manganese is from 0.1 to 0.3% by weight based on the weight of said metal iron.

4. The magnetic metallic powder according to claim 1, wherein said alkaline earth metal is selected from at least one member of the group consisting of calcium and magnesium.

5. The magnetic metallic powder according to claim 1, wherein the amount of said alkaline earth metal is from 1 to 30 times the amount of said manganese.

6. A magnetic recording medium comprising a substrate and a magnetic layer formed thereon, said magnetic layer comprising a magnetic metallic powder in a binder, said magnetic metallic powder consisting essentially of metal iron, at least 0.1% by weight of manganese based on the weight of said metal iron and at least one alkaline earth metal in an amount of from 1 to 50 times the weight of said manganese.

7. The magnetic recording medium according to claim 6, wherein in said magnetic metallic powder, the amount of manganese is from 0.1 to 1% by weight based on the weight of said metal iron.

8. The magnetic recording medium according to claim 7, wherein in said magnetic metallic powder, the amount of manganese is from 0.1 to 0.3% by weight based on the weight of said metal iron.

9. The magnetic recording medium according to claim 6, wherein in said magnetic metallic powder, said alkaline earth metal is selected from at least one member of the group consisting of calcium and magnesium.

10. The magnetic recording medium according to claim 6, wherein in said magnetic metallic powder, the amount of the alkaline earth metal is from 1 to 30 times the amount of said manganese.

* * * * *